April 12, 1960 F. W. LINDBLOM 2,932,066
METHOD OF MAKING SPECTACLE TEMPLES
Filed April 3, 1958
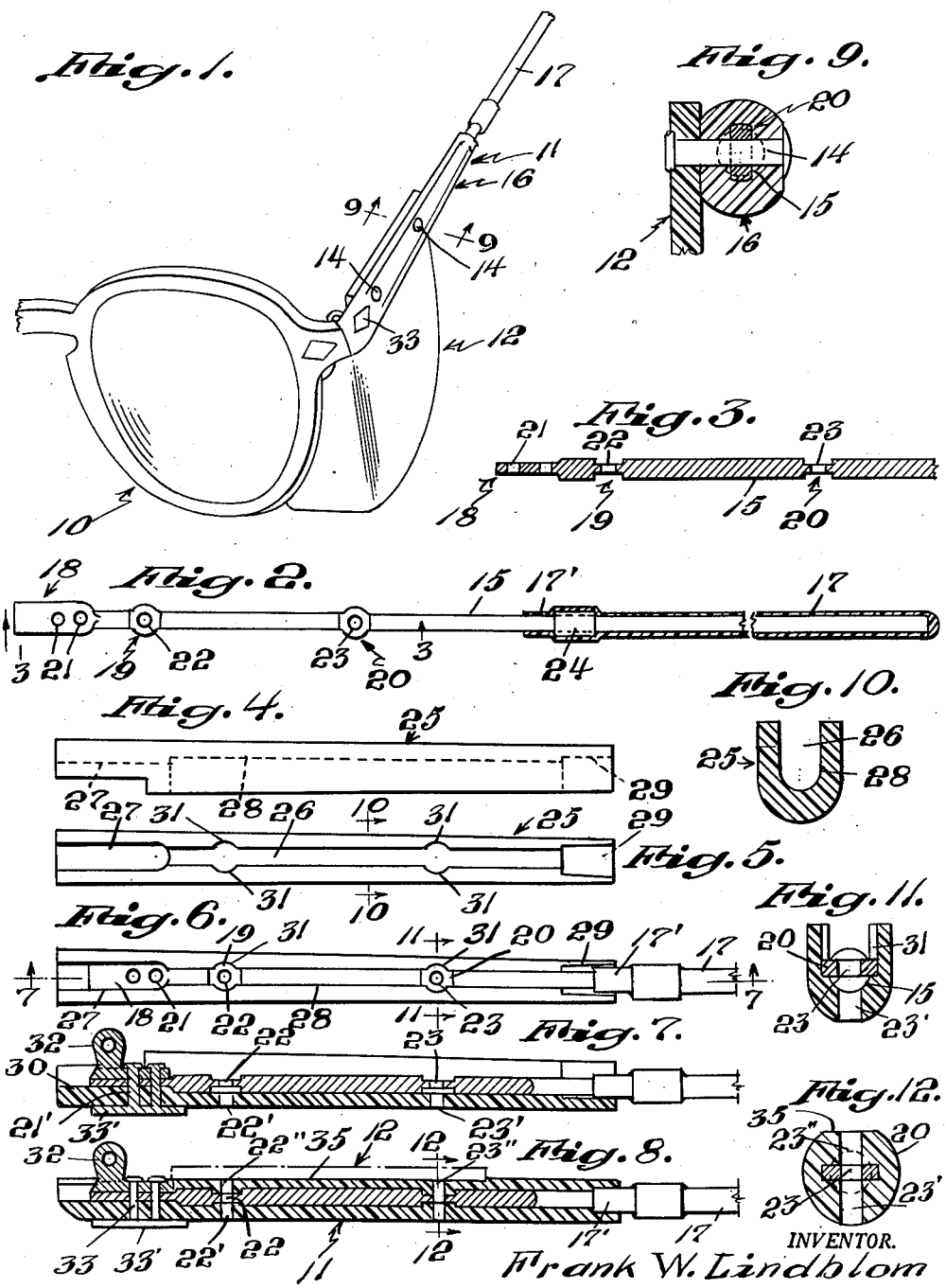
INVENTOR.
Frank W. Lindblom
BY Barlow & Barlow
ATTORNEYS.

United States Patent Office 2,932,066
Patented Apr. 12, 1960

2,932,066

METHOD OF MAKING SPECTACLE TEMPLES

Frank W. Lindblom, Warwick, R.I., assignor to Welsh Manufacturing Company, a corporation of Rhode Island Application April 3, 1958, Serial No. 726,181

2 Claims. (Cl. 18—59)

This invention relates to improvements in spectacle goggles particularly to a method attaching side guards or shields on the temples of the spectacle.

In spectacle goggles of which I am familiar, the temples are made with a round metal wire core which is centrally embedded at the hinge end portion thereof within a plastic sleeve to which there is attached guards or side shields. The shields are in some instances, adhesively secured to the plastic sleeve and in other instances the shields are attached to the temples by rivets. When rivets are used, the sleeve is pierced so as to provide rivet openings. It is desirable to have the openings pass centrally through the metal core but since the piercing is usually a drilling operation, and it is most difficult to perform with desired accuracy because the relative softness of the sleeve material compared to the round metal core embedded therein. The softness of the material will yield so that when the drill engages the metal core, it will shift to one side of the center and result in an off-center opening. Often times the hole made passes all to one side of the metal core. This not only mars the appearance of the goggle but results in a poor fastening of the shield to the temple.

Both methods above described for attaching side shields to the temple of spectacle goggles are unsatisfactory, particularly when the said goggles are the industrial type which are subjected to very hard usage.

An object of the present invention is to improve generally in the method of attaching side shields to the temples of spectacle goggles.

A more specific object of the invention is to provide a novel method of attaching the shields to the temples by means of rivets and in which the rivet holes may be accurately pierced centrally through the metal core of the temples.

Another object of the invention is to provide a novel method of attaching the shields to the temples by rivet means and in which the temples will be made so as to provide a template for piercing the holes through the sleeve.

With these and other objects in view, the invention consists of certain novel features of construction as will be more fully described and particularly pointed out in the appended claims.

In the accompanying drawings:

Figure 1 is a perspective view of a portion of a spectacle goggle embodying the invention;

Figure 2 is a plan view of the temple shown in Figure 1, with a portion thereof removed to show the interior structure of the temple;

Figure 3 is a sectional view taken along line 3—3 of Figure 2;

Figure 4 is a side elevational view of a portion of the temple at one stage of the construction thereof;

Figure 5 is a bottom plan view thereof;

Figure 6 is a view similar to Figure 5 with the temple portion sleeve shown in Figure 2 received therein;

Figure 7 is a sectional view taken substantially along line 7—7 of Figure 6;

Figure 8 is a similar view showing the temple in an advanced stage of construction; and Figures 9, 10, 11 and 12 are sectional views taken respectively along lines 9—9; 10—10; 11—11; and 12—12 of Figures 1, 5, 6 and 8.

The spectacle of the present invention has a plastic lens frame portion 10, temples 11 and side shields 12 which are secured to the temples by rivets 14. The temple 11 has a metal core 15 (Figure 9) the hinge end portion of which is embedded in a plastic sleeve 16. A sheath 17 encloses the remaining portion of the core and extends from the sleeve 16 to the extreme end of said core.

In accordance with the present embodiment of the invention, the core 15 is made of round metal wire and is flattened at the hinge end portion thereof on opposite sides of the wire as at 18, 19 and 20. This may be readily accomplished in a known manner, such as for example by a swaging operation with the use of suitable swaging tools. The flattened portion 18 is pierced with rivet openings 21 and the flattened portions 19, 20 are similarly pierced with a single rivet opening 22 and 23, respectively. A split sleeve having relatively thin walls is inserted and welded or otherwise secured to the core so as to provide an abutment 24 for a purpose which will hereinafter appear.

The sleeve 16 is made of plastic material and fabricated so as to provide a general U-shape member 25 (see Figures 4, 6 and 10) having a recess 26 extending from end to end and inwardly from one side thereof and arranged in step formation so as to provide three recess portions 27, 28 and 29. The recess portion 27 is made at one end of member 25, the bottom wall 30 thereof being made flat. The intermediate recess portion 28 is greater in depth than recess 27 and the bottom wall thereof is made arcuate as best seen in Figure 10, while the side walls thereof are grooved as at 31. The recess portion 29 is made slightly deeper than recess 28 and the bottom wall thereof is made arcuate. The member 25 as above described may be fabricated by any well-known means, as for example, by molding to the shape described or by known machine operations.

The core 15 is inserted in the recess 26 to engage the bottom wall thereof with the flattened portion 18 engaged in the recess portion 27 and the flattened portions 19, 20 lodged in the grooves 31. The openings 21, 22 and 23 may now be extended through the bottom wall of the recess 26 as at 21′, 22′ and 23′ as by means of a drilling operation or other suitable piercing operation, the openings in the core receiving the drill or piercing tools and serving as guides during the said piercing operation. Without removing the core from member 25, the hinge part 32 (see Figure 7) carried by the temple is positioned on the flattened portion 18 with the rivet openings previously made therein positioned in registry with the openings 21. Rivets 33 which have a common head 33′ are inserted through the now aligned openings 21′, 21 and through the hinge part 32 and upset in the known manner for securing the hinge part 32, core 15 and member 25 together. As will be seen in Figure 2, the sheath 17 which is closed at the free end extremity thereof is passed over the temple wire and stretched to pass over abutment 24, the portion 17′ of the sheath inwardly of the abutment 24 extending into recess portion 29 of member 25, the abutment 24 serving to secure the sheath 17 at the inner end thereof from slippage along the temple wire.

The temple 11 is now in condition for further operations thereon so as to close the member 25 about the core 15 to embed the same and to shape member 25 to the desired configuration. This may be accomplished in various ways, as by way of example, by means of a swaging operation with the use of proper swaging dies. Member 25, as previously mentioned, is made of a plastic which may be molded under heat and pressure, as for example, a polyvinyl chloride or cellulose acetate butyrate. Accordingly, during the swaging operation, member 25 may be subjected to sufficient heat to allow the deformation thereof to a desired shape, the abutting edges fusing with each other. Thus the sleeve 11 is formed about the core 15, which also embeds portion 17' of the sheath 17.

The temple 11 is subjected to a further piercing operation so as to extend the previously made openings completely through the sleeve. This is accomplished by passing the drill or other piercing tool through openings 22', 22 and openings 23', 23 which properly guide the tool during the piercing of the extended openings 22" and 23" through the opposite side of the sleeve (see Figure 8). The sleeve may now be further operated on to provide a flat surface 35 to receive the shield 12. The flat surface may be provided during the swaging operation thereon previously mentioned or by a milling operation. The rivets 13 may now be inserted through the openings 22, 23 and through the shield to secure the same in position on the temple 11.

From the foregoing it will be seen the rivet holes for the shield are accurately disposed centrally through the core 15 so as to assure a rigid fastening for the shield. It will also be apparent that flattening the area about the said rivet openings allows the use of a rivet of larger diameter and thus a more secure holding of the shield in position.

I claim:

1. The method of making a spectacle temple for attaching a side shield thereto by rivets, which comprises providing a metal wire core, piercing said core with rivet receiving openings, providing a generally U-shape non-metallic member with sides and a bight portion joining the sides, inserting said core between the sides of said U-member and against the bight, piercing said bight thereof with a piercing tool extending through the openings in said core for guiding said tool during the piercing operation, thereafter subjecting said non-metallic member to a swaging operation to close the same about said core to embed the same therein, and extending the piercing through the side of said member opposite to said opening by inserting the piercing tool through the previously made opening to be guided thereby during the latter piercing operation.

2. The method of making a spectacle temple for attaching a side shield thereto by rivets, which comprises providing a metal round wire core, flattening said core at spaced portions, piercing the said flattened portions with rivet receiving openings, providing a generally U-shape non-metallic member with sides and a bight portion joining the sides, inserting said core between the sides of said U-member and against the bight thereof with the said opening in said core lying adjacent said bight, piercing said bight with a piercing tool extending through the openings in said core for guiding said tool during the piercing operation, thereafter subjecting said non-metallic member to a swaging operation to close the same about said core to embed the same therein, and extending the piercing through the side of said member opposite to said opening by inserting the piercing tool through the previous made opening to be guided thereby during the latter piercing operation.

References Cited in the file of this patent

UNITED STATES PATENTS

| | | |
|---|---|---|
| 1,337,330 | Schwab | Apr. 20, 1920 |
| 1,459,778 | Leytham | June 26, 1923 |
| 1,527,237 | Tully | Feb. 24, 1925 |
| 1,649,790 | Stevens | Nov. 15, 1927 |
| 1,656,402 | Uhlemann | Jan. 17, 1928 |
| 2,281,129 | Wolff | Apr. 28, 1942 |